(12) United States Patent
Kerin, Jr.

(10) Patent No.: US 10,816,121 B2
(45) Date of Patent: Oct. 27, 2020

(54) QUICK CONNECT COUPLING WITH VERIFIER

(71) Applicant: Martinrea Industries, Inc., Troy, MI (US)

(72) Inventor: James J. Kerin, Jr., Brighton, MI (US)

(73) Assignee: Martinrea International US Inc., Auburn Hills, MI (US)

( * ) Notice: Subject to any disclaimer, the term of this patent is extended or adjusted under 35 U.S.C. 154(b) by 361 days.

(21) Appl. No.: 15/971,131

(22) Filed: May 4, 2018

(65) Prior Publication Data
US 2018/0328525 A1    Nov. 15, 2018

Related U.S. Application Data

(60) Provisional application No. 62/503,646, filed on May 9, 2017.

(51) Int. Cl.
| | |
|---|---|
| *F16L 37/098* | (2006.01) |
| *F02M 37/00* | (2006.01) |
| *B60K 15/03* | (2006.01) |
| *F16L 37/244* | (2006.01) |
| *B60K 15/01* | (2006.01) |
| *F16L 37/088* | (2006.01) |

(52) U.S. Cl.
CPC .......... *F16L 37/0987* (2013.01); *B60K 15/01* (2013.01); *B60K 15/03* (2013.01); *F02M 37/0017* (2013.01); *F16L 37/0885* (2019.08); *F16L 37/2445* (2013.01); *B60K 2015/03467* (2013.01); *F16L 2201/10* (2013.01)

(58) Field of Classification Search
CPC ... F16L 37/084; F16L 37/0941; F16L 37/088; F16L 37/0885; F16L 37/098; F16L 37/0985; F16L 37/0987; F16L 37/12; F16L 37/1225
USPC ..................................... 285/81, 82, 307, 319
See application file for complete search history.

(56) References Cited

U.S. PATENT DOCUMENTS

| | | | | |
|---|---|---|---|---|
| 4,913,467 | A * | 4/1990 | Washizu | F16L 37/0985 285/39 |
| 5,090,747 | A * | 2/1992 | Kotake | F16B 21/16 285/305 |
| 5,160,177 | A * | 11/1992 | Washizu | F16L 37/0987 285/319 |
| 5,303,963 | A | 4/1994 | McNaughton et al. | |
| 5,586,792 | A | 12/1996 | Kalahasthy et al. | |
| 5,683,117 | A | 11/1997 | Corbett et al. | |
| 5,863,077 | A | 1/1999 | Szabo et al. | |
| 5,897,145 | A * | 4/1999 | Kondo | F16L 37/0987 285/319 |

(Continued)

*Primary Examiner* — Aaron M Dunwoody
(74) *Attorney, Agent, or Firm* — Dinsmore & Shohl LLP

(57) ABSTRACT

A quick connect coupling having a female part with a throughbore for receiving a tube having an annular extending bead. A latch is supported in the female part in communication with the throughbore. A verifier is provided in stacked arrangement with the latch. Insertion of the tube results in extending sides of the latch expanding outwardly and likewise expanding the extending sides of the verifier. Upon passage of the bead past the latch, the latch seating in the engaged position, with the verifier held open by alignment with the annular bead. The verifier subsequently being displaced to a fully engaged position to indicate that the fluid coupling is fluidly and fully connected.

19 Claims, 15 Drawing Sheets

(56) References Cited

U.S. PATENT DOCUMENTS

| | | | |
|---|---|---|---|
| 6,142,537 A * | 11/2000 | Shimada | F16L 37/142 |
| | | | 285/308 |
| 6,293,596 B1 | 9/2001 | Kinder | |
| 6,634,679 B1 | 10/2003 | Stieler | |
| 6,637,779 B2 | 10/2003 | Andre | |
| 6,866,303 B2 | 3/2005 | Szabo et al. | |
| 7,128,347 B2 * | 10/2006 | Kerin | F16L 37/088 |
| | | | 285/305 |
| 7,390,025 B2 * | 6/2008 | Pepe | F16L 37/144 |
| | | | 285/93 |
| 7,484,774 B2 * | 2/2009 | Kerin | F16L 37/0885 |
| | | | 285/305 |
| 7,494,156 B2 * | 2/2009 | Okada | F16L 37/0987 |
| | | | 285/319 |
| 7,497,477 B2 | 3/2009 | Pepe | |
| 7,967,342 B2 | 6/2011 | Gunderson | |
| 8,113,547 B2 | 2/2012 | Andre | |
| 8,113,548 B2 | 2/2012 | Gunderson | |
| 8,240,716 B2 | 8/2012 | Kerin et al. | |
| 8,740,256 B2 | 6/2014 | Fansler et al. | |
| 8,939,470 B2 | 1/2015 | Gunderson | |
| 8,973,952 B2 | 3/2015 | Nishino et al. | |
| 9,115,837 B2 | 8/2015 | Barthel et al. | |
| 9,523,453 B2 | 12/2016 | Arnold et al. | |
| 9,671,051 B2 | 6/2017 | Frick | |
| 9,777,876 B2 | 10/2017 | Kaneko et al. | |
| 9,890,887 B2 | 2/2018 | Barthel et al. | |
| 2005/0258646 A1 | 11/2005 | Gunderson | |
| 2006/0170211 A1 | 8/2006 | Matsubara | |
| 2008/0048442 A1 | 2/2008 | Kerin et al. | |
| 2008/0315576 A1 * | 12/2008 | Moretti | F16L 37/0885 |
| | | | 285/82 |
| 2010/0276924 A1 * | 11/2010 | Gillet | F16L 37/144 |
| | | | 285/93 |
| 2011/0127766 A1 | 6/2011 | Tsurumi | |
| 2012/0326435 A1 | 12/2012 | Okazaki | |
| 2014/0197629 A1 | 7/2014 | Barthel et al. | |
| 2014/0284915 A1 | 9/2014 | Arnold et al. | |
| 2016/0201835 A1 * | 7/2016 | Jones | F16L 37/0841 |
| | | | 285/305 |
| 2016/0238173 A1 | 8/2016 | Kujawski, Jr. | |
| 2018/0347739 A1 * | 12/2018 | Chatelain | F16L 37/0982 |

* cited by examiner

QUICK CONNECT COUPLING WITH VERIFIER

CROSS REFERENCE TO RELATED APPLICATIONS

The present application claims the priority of U.S. Ser. No. 62/503,646 filed May 9, 2017.

BACKGROUND OF THE INVENTION

In many internal combustion engines, such as automotive engines, quick connect couplings are used to complete the fluid connection between the fuel tank and the other components of the fuel system of the engine. Such quick connect couplings facilitate the rapid connection of the fuel system components together during the assembly of the vehicle which reduces the overall assembly time required to assemble the engine. Such reduction in the assembly time reduces the overall cost of the vehicle.

In practice, quick connect couplings have proven to be safe and durable when used to assemble the fuel system components together provided, however, that the male and female components of each quick connect coupling are fully connected together and locked in the connected position. However, in practice, a quick connect coupling that is not fully connected together results in a defective fluid connection which can disconnect during operation of the engine.

In order to ensure that the quick connect couplings are fully coupled together during the assembly of the engine, many previously known quick connect couplings use a verifier of one sort or another which provides a visual signal only when the fluid coupling is fully coupled and locked together. These previously known quick connect couplings with verifier have proven effective in confirming whether or not the fluid connector is fully coupled together. However, in many cases, the actual inspection of the quick connect coupling to ensure that the coupling is fully connected together was difficult, time consuming to perform and prone to error.

SUMMARY OF THE PRESENT INVENTION

The present invention provides a quick connect coupling particularly suitable for fuel systems in automotive vehicles. The coupling includes a female part with a throughbore for receiving a tube having an annular extending bead or protuberance. A latch is supported in the female part in communication with the throughbore. A verifier is provided in stacked arrangement with the latch. Insertion of the tube results in a pair of extending sides of the latch being expanded outwardly, with an aligning pair of sides of the verifier likewise being expanded. Upon passage of the bead past the latch, the latch seating in the engaged position, with the verifier sides held open by alignment with the annular bead of the inserted tube. The verifier is subsequently displaced to lock the latch into position and to indicate that the fluid coupling is fluidly and fully connected.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF THE INVENTION

With reference to the attached illustrations, the present invention discloses a quick connect coupling for use with a vehicle. As will be described in reference to the succeeding illustrations, it is understood that the quick connect coupling can be utilized for completing a fluid connection between the fuel tank and other components of the fuel system of an engine.

Figure 1:
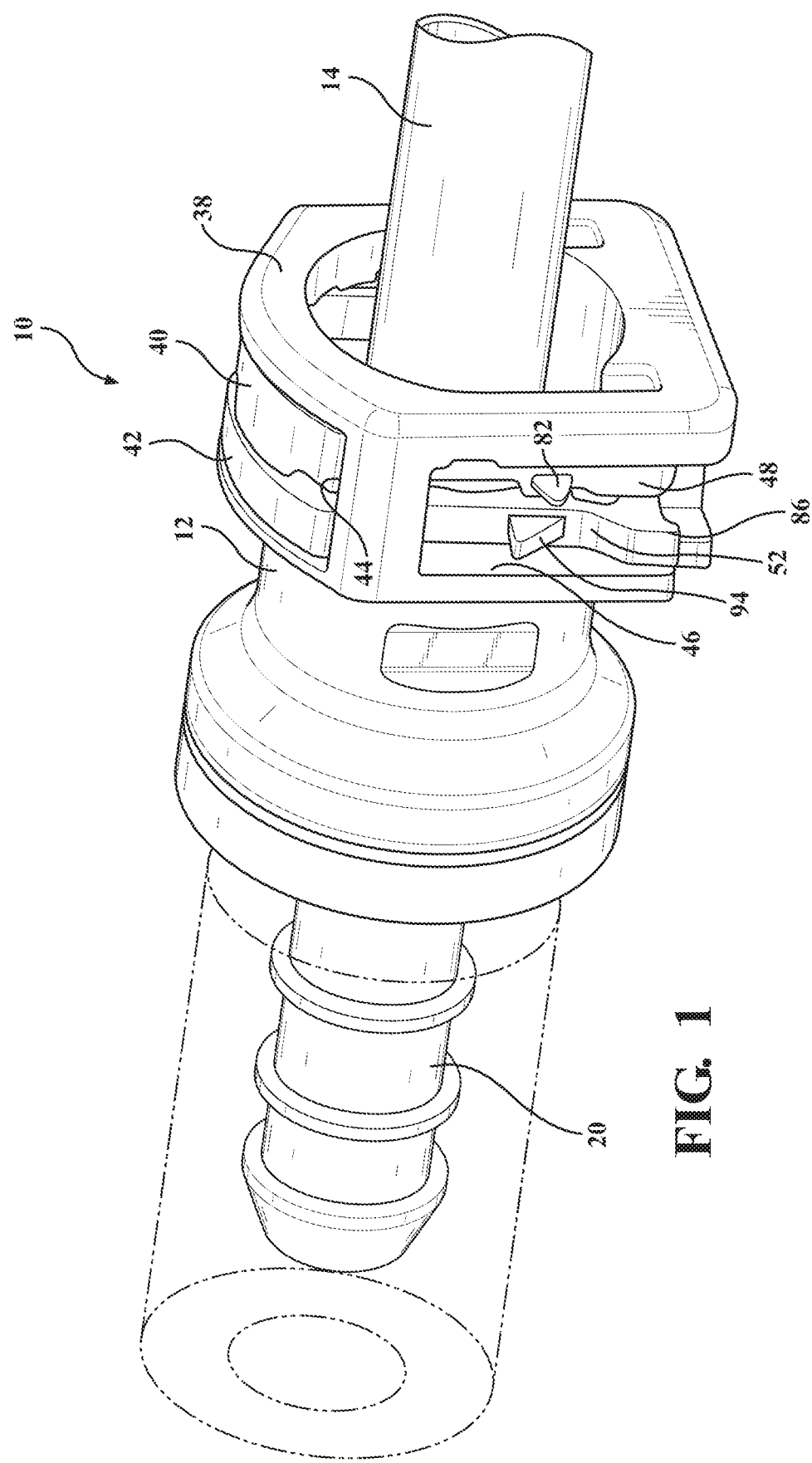
FIG. 1 is an elevation view of the fluid coupling according to an embodiment of the present invention.

Referring initially to FIG. 1, an elevation view is shown at 10 of the fluid coupling according to an embodiment of the present invention. The coupling has a housing 12 with a female part and an interconnected insertion tube 14. The tube 14 also includes a radially outwardly extending bead 16 adjacent its end. This bead 16, furthermore, extends entirely around the cylindrical tube 14.

The housing female part 12 incorporates a throughbore 18 (see FIG. 14) which communicates the female part with a connected male part 20, the throughbore receiving the tube 14 having the annular extending bead 16. Without limitation, the female part 12 and male part 20 of the quick connect housing can be constructed of a suitable material typically including a plastic but also envisioning metal or other composites, and it is further envisioned that a further hose or conduit (not shown) is secured over the narrowed diameter male part 20 so that the throughbore communicates the installed tube 14 with the outlet of the male part 20.

Figure 14:
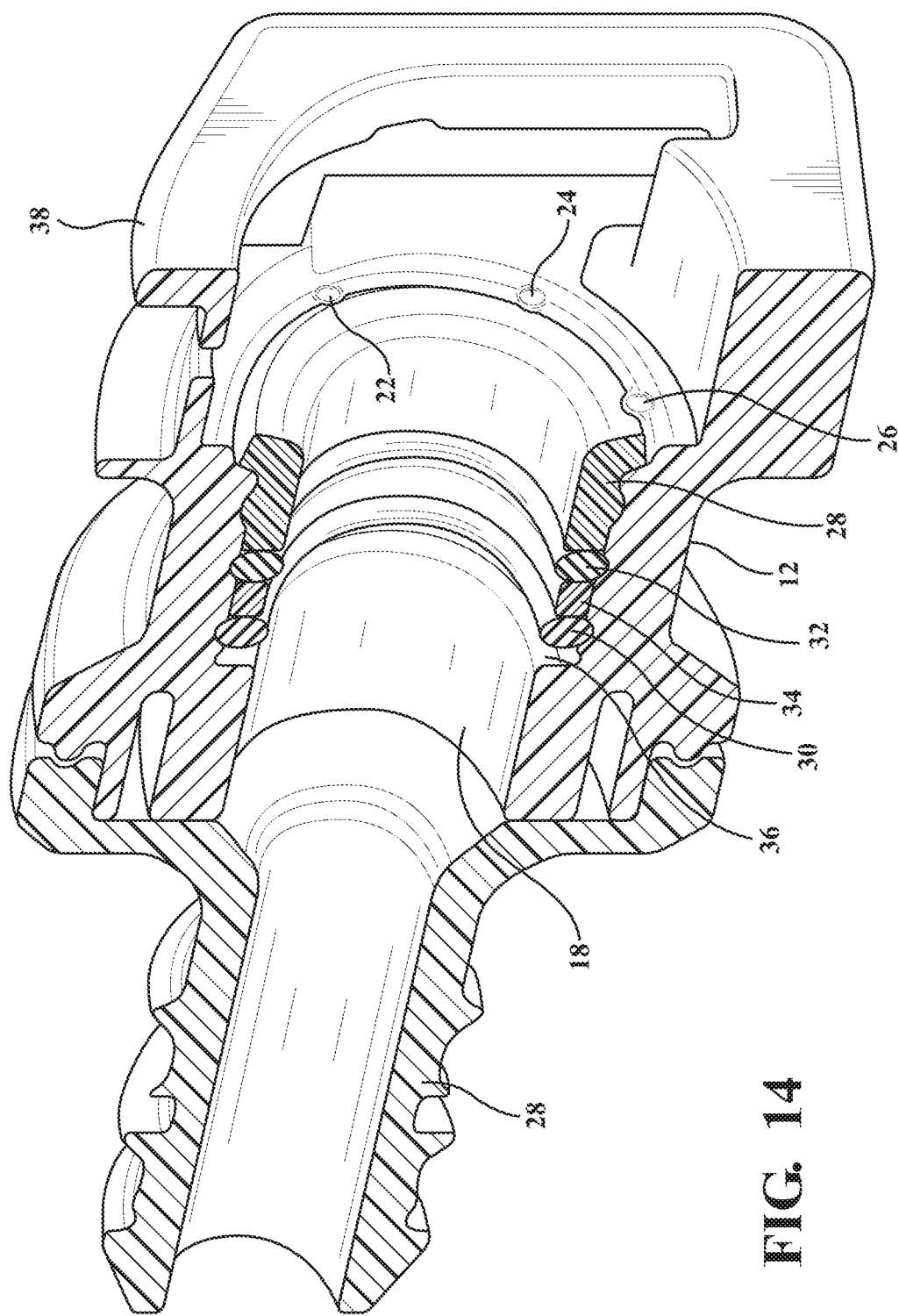
FIG. 14 is a linear cutaway perspective of the quick connect housing illustrating the male and female parts and further depicting an sleeve shaped spacer which is heat staked within the body head of the female part, such in order to prevent separation in particular during disengagement of the tube.

The cutaway illustration of FIG. 14 further depicts a heat staking operation, see locations at 22, 24, 26, et seq. for securing a tubular outer spacer 28 within the housing female part in proximity to the receiving end of the tube 14 and annular bead 16. The spacer 28 is provided in combination with an arrangement of seals 30 and 32 and interposed annular support 34 compressed between the outer spacer 28 and an inward annular shoulder location 36 for providing pressurized sealing support between the female 12 and male 20 portions of the housing.

Without limitation, the heat staking operation can be provided according to any plurality and angular offset, such as including but not limited to placing the heat stake locations at 60 degree offset (total of six), as well as providing any other shape or profile. In any application, the heat staking operation ensures that the outer spacer is retained within the body head and avoids instances of axial separation, such as following detached separation of the tube and bead in the manner subsequently described.

As best shown in FIG. 1, the female housing part 12 further integrates an insertion end 38 (this being shown in cutaway in the remaining views) having an outline corresponding to each of a latch 40 and verifier 42. The latch and verifier are constructed of a similar plastic and resilient material and are provided in a stacked arrangement and installed within the female part in communication with the inserting direction of the tube 14 through the interior throughbore 18, these further being arranged in a stacked arrangement and supported within the end 38 through a top located installation slot (see inner extending edge profile 44). The insertion end 38 further exhibits opposite side cutout profiles, one of which is illustrated by perimeter edge 46 in FIG. 1 for seating extending pairs of extending sides or legs of each of the latch 40 and verifier 42, and such that the latch and verifier each exhibit a generally "U" shape surrounding on three sides the cross sectional profile of the inserted tube 14.

Figure 5:
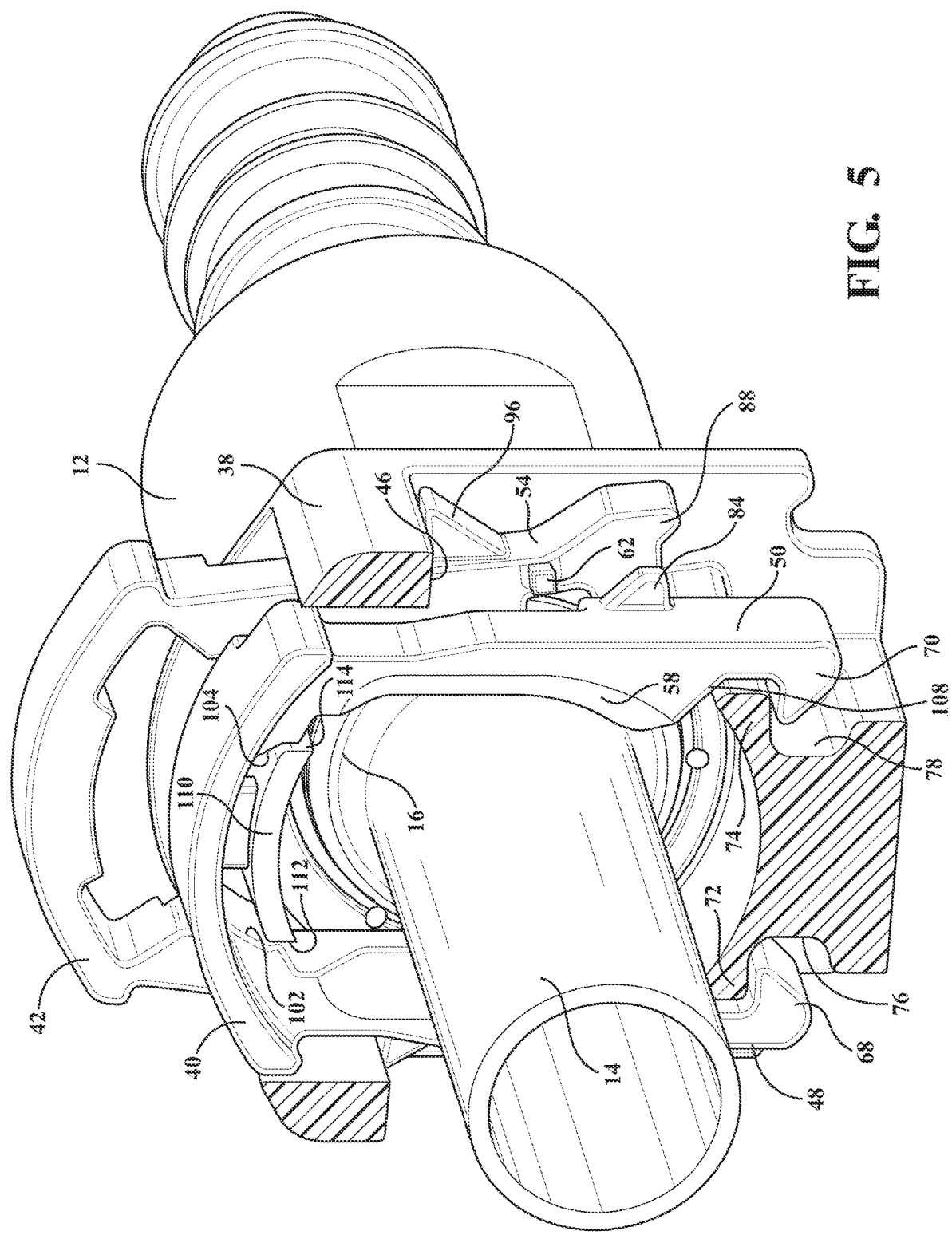
FIG. 5 is a view similar to FIG. 4, but illustrating the tube fully inserted into the connector to a fully connected position.
Figure 12:
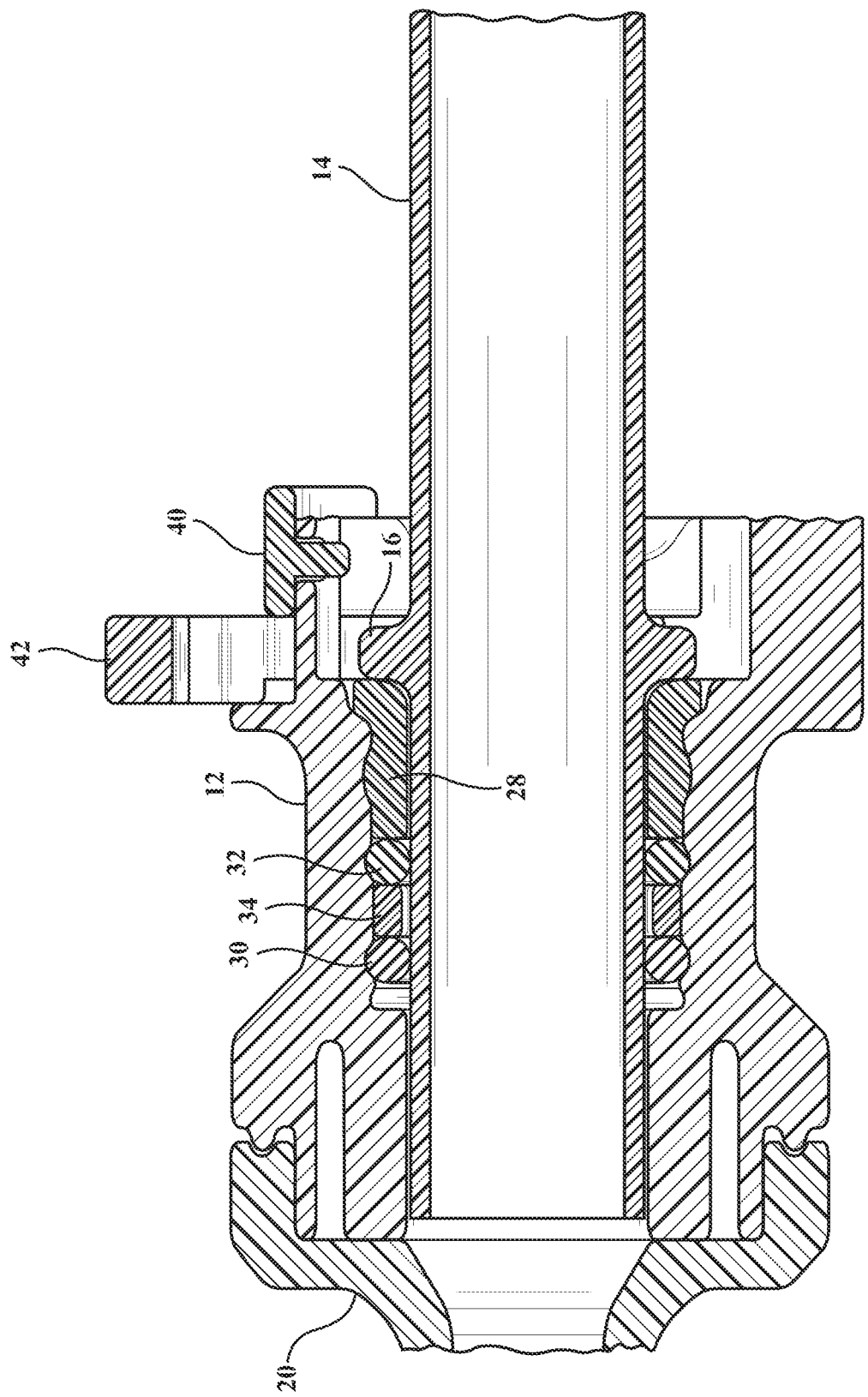
FIG. 12 is a further succeeding plan cutaway view corresponding to FIG. 5 and illustrating the tube installed through the latch and with the sides of the verifier held open by alignment with the annular bead representing the tube in an installed position.
Figure 13:
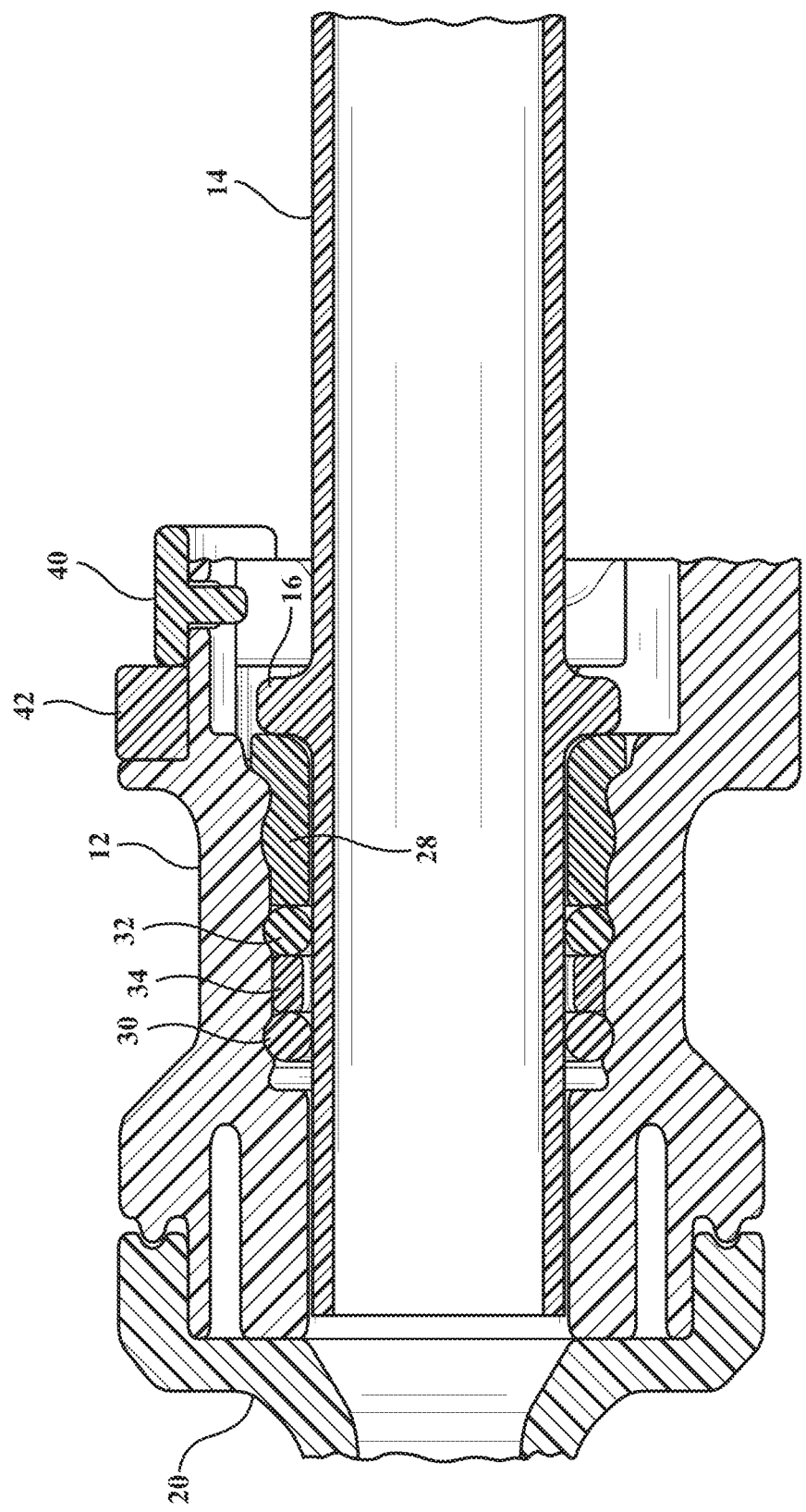
FIG. 13 is a yet further succeeding plan cutaway view to FIG. 12 with the verifier displaced to lock the engaged latch in its position to hold the tube within the quick connect housing.

As will be further described, insertion of the tube 14 results in a pair of downwardly extending sides associated with each of the latch 40 (at 48 and 50) expanding outwardly and likewise expanding similarly directed and extending sides of the verifier 42 (these further depicted at 52 and 54). Upon passage of the tube supported bead 16 past the latch 40, the latch seats in the engaged position, with the verifier 42 held open by alignment with the annular bead 16 (FIGS. 5 and 12). The verifier is subsequently displaced (downwardly) to a fully engaged position (FIGS. 6 and 13) to lock the latch engagement and to indicate that the fluid coupling is fluidly and fully connected.

With particular reference to FIGS. 4-8 and 10-13, both the latch 40 (also termed a lock) and the verifier 42 are slidably mounted within the receiving end 38 of the housing female part as described, so that both the latch and verifier are movable in a direction generally radial with respect to the axis of the elongated housing (female part 12 and interconnected male part 20) and its throughbore 18. The latch 40 and verifier 42, furthermore, are positioned adjacent to each other, such as in a stacked arrangement as will be further described, proximate the open receiving end 38 of the female part housing 12.

As also afore-described, both the latch 40 and verifier 42 are generally U shaped and made of a flexible and resilient material such as plastic. As such, both the verifier and lock are able to flex during insertion of the tube 14 into the housing female part 12. Furthermore, the verifier 42 is movable between a radially extended or expanded position, shown in FIGS. 4 and 5, and a radially displaced and locked position, shown in FIG. 6. In its locked position, the latch 40 and verifier 42 are generally aligned with each other as best shown in each of FIGS. 1, 6, 8 and 13).

Figure 2:
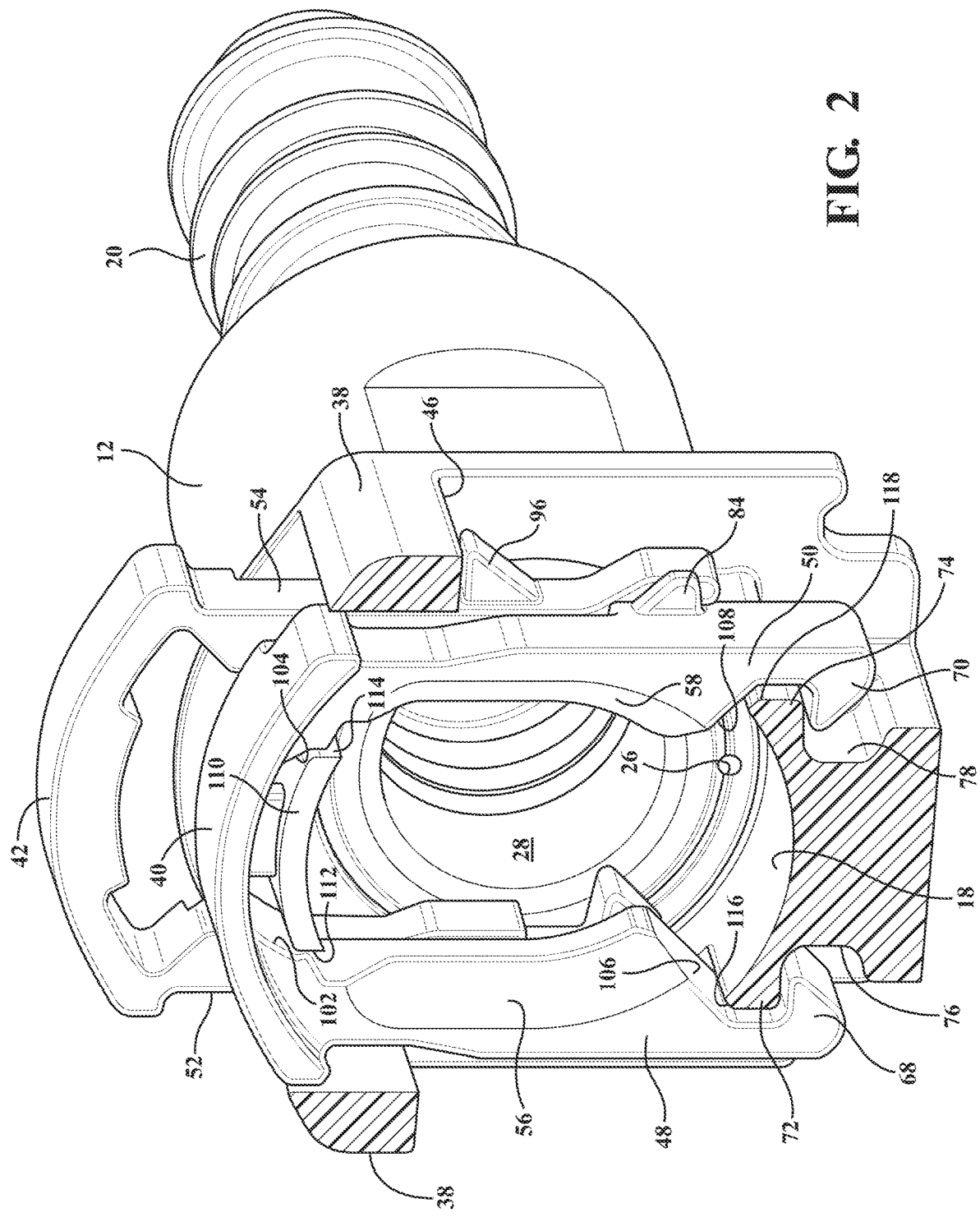
FIG. 2 is an elevational view of the fluid connector in a fully connected but unlocked position and with parts removed for clarity.
Figure 4:
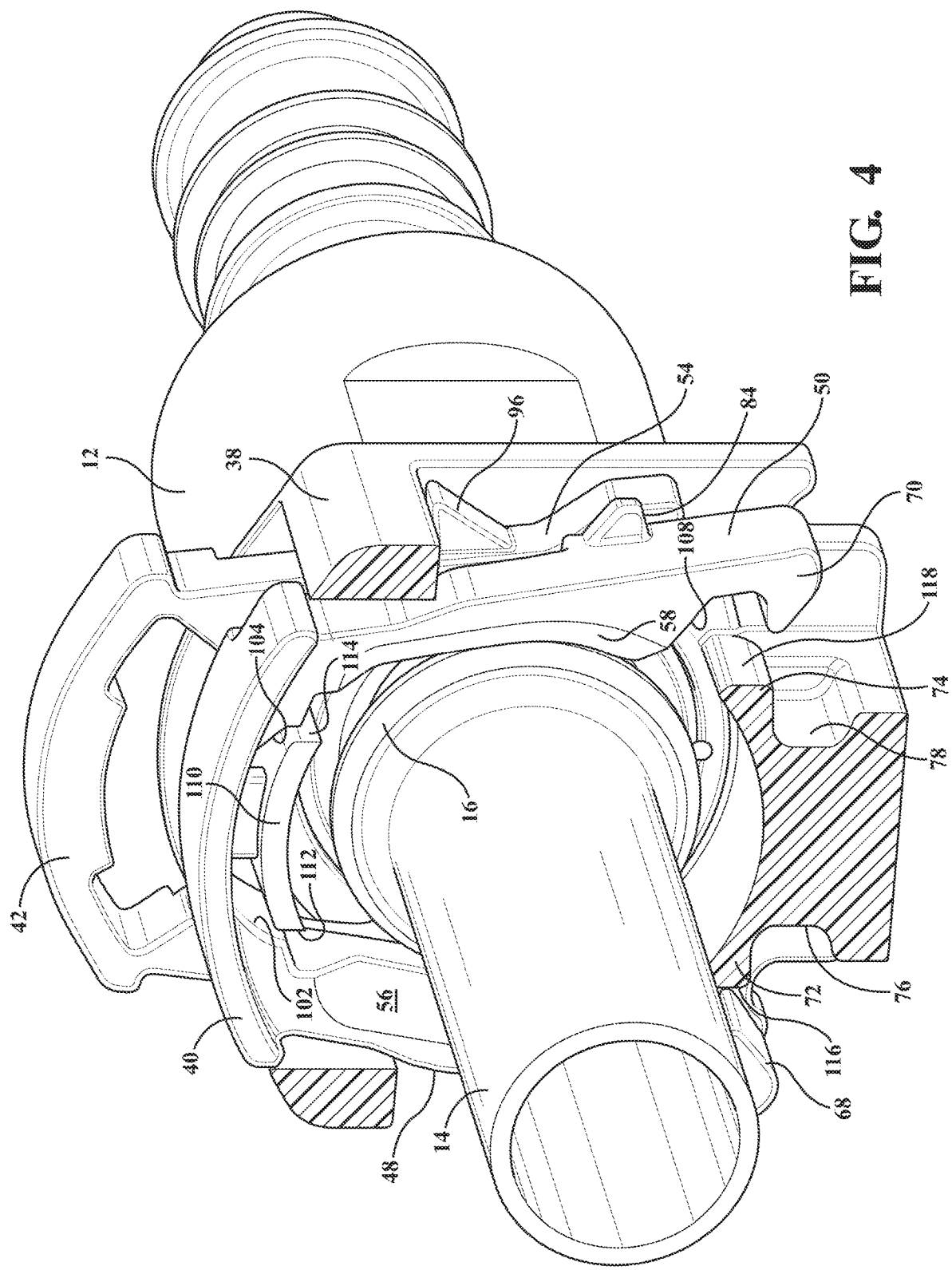
FIG. 4 is a view similar to FIG. 2, but illustrating the fluid connector with the tube partially, but not fully, inserted into the connector.

As best shown in FIGS. 2 and 4, upon the initial insertion of the tube 14 into the housing female part 12, the tube bead 16 engages a pair of flared or chamfered extending surfaces 56 and 58 configured on the extending sides 48 and 50 of the latch 40 in a direction opposing the inserting direction of the tube 14 and so that the chamfered surfaces are contacted by the annular bead 16. Upon further insertion the two sides 48 and 50 of the latch 40 deflect outwardly and away from each other as long as the bead 16 is aligned with the latch 40.

At this time, as the two sides 48 and 50 of latch 40 are extended outward, a pair of axially extending tabs 60 and 62 (FIGS. 8 and 9) protruding from each of the sides 52 and 54 of the verifier 42 are slaved against and within recessed channels 64 and 66 (best shown in pre-installation top view of FIG. 9) defined in opposing contact locations within the sides 48/50 of the latch 40, and so that the sides of the verifier 42 are moved outward at the same rate as the latch 40.

Further insertion of the tube 14 causes the bead 16 to enter into the verifier pocket area, expanding further the sides 52 and 54 of the verifier 42 out of the recessed channels 64 and 66 in the sides 48 and 50 of the latch 40. This will clear the way for the bead 16 to enter into the area of the verifier 42 so that the verifier engagement can be confirmed.

Figure 3:
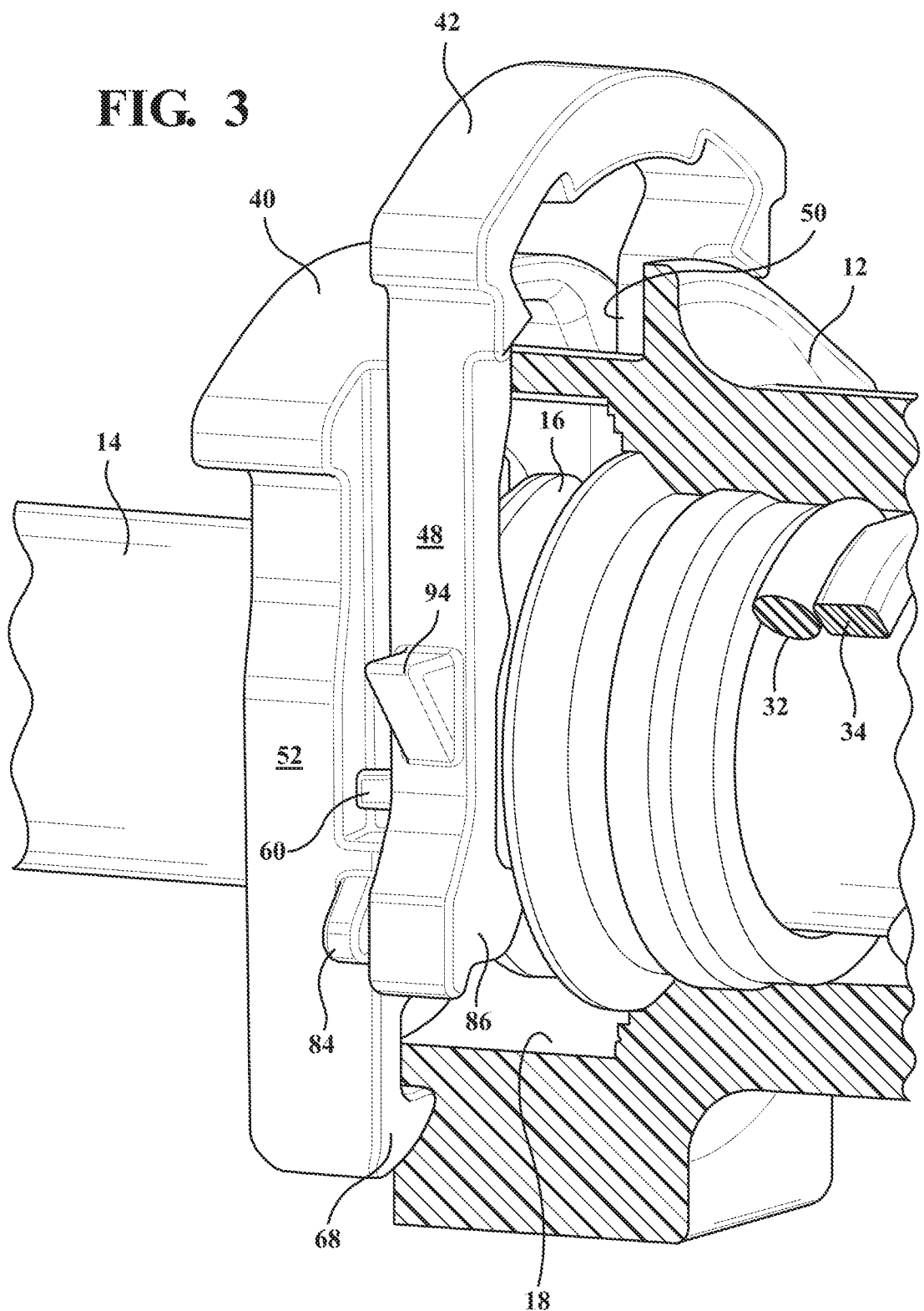
FIG. 3 is a further elevational view of a preferred embodiment of the fluid coupling of the present invention with the tube engaged and with parts removed for clarity.
Figure 9:
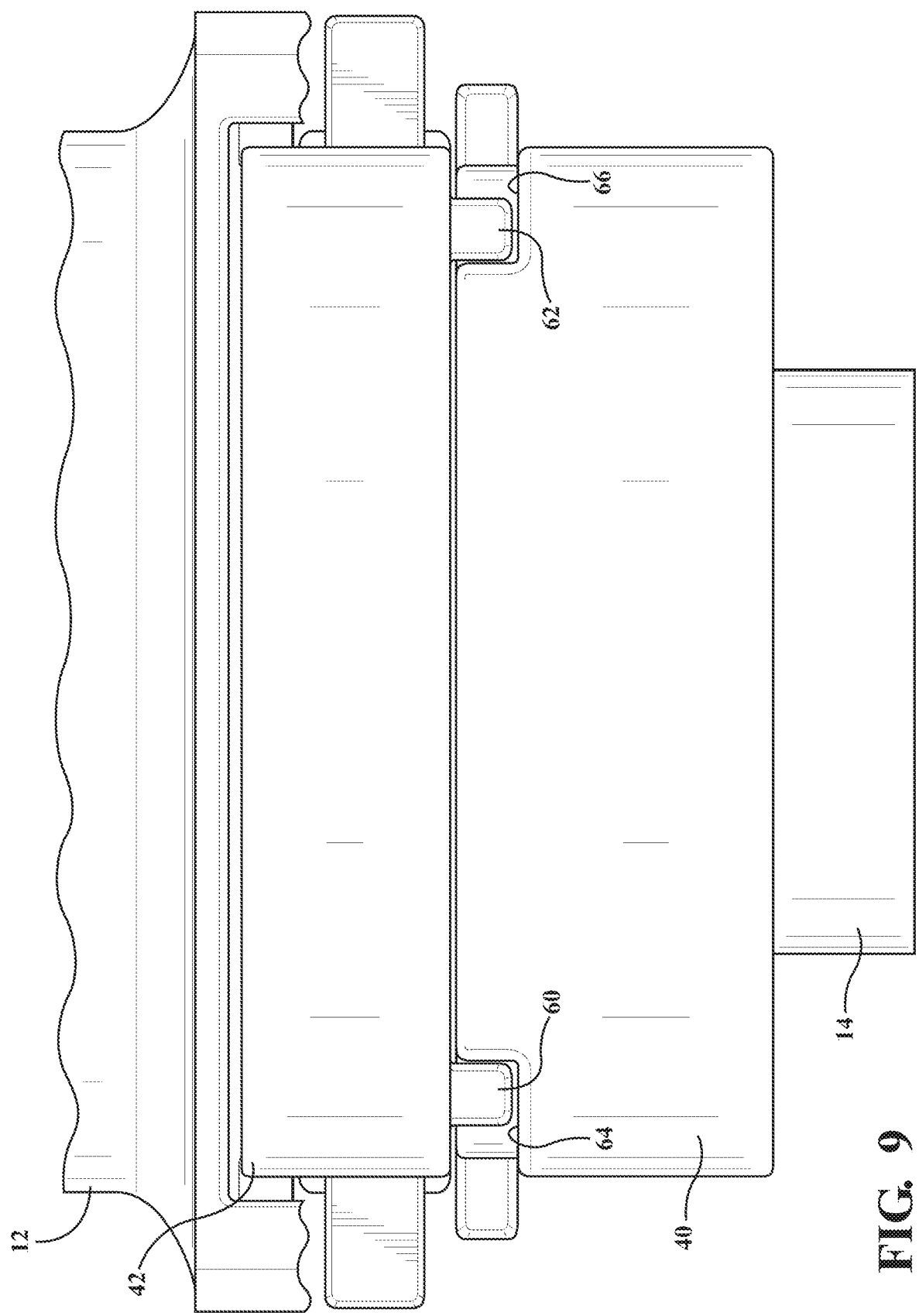
FIG. 9 is a top view illustrating the stacked arrangement of the latch and verifier and illustrating a tab protruding from each of the sides of the verifier, the tabs seating within recessed channels defined in opposing contact locations of the sides of said latch prior to insertion of the tube.
Figure 10:
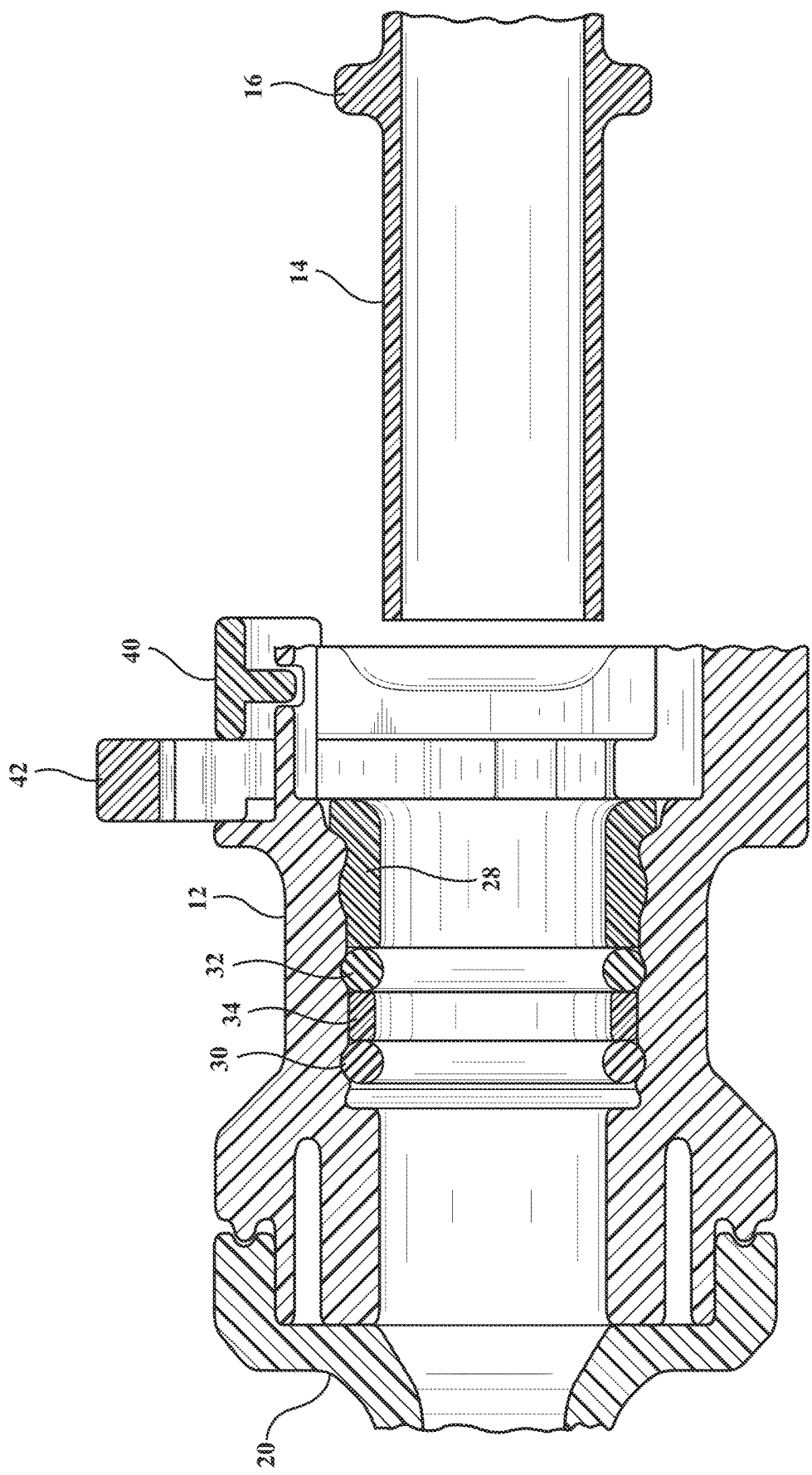
FIG. 10 is a plan cutaway of the quick connect coupling in the pre-installed position of FIGS. 2 and 7.
Figure 11:
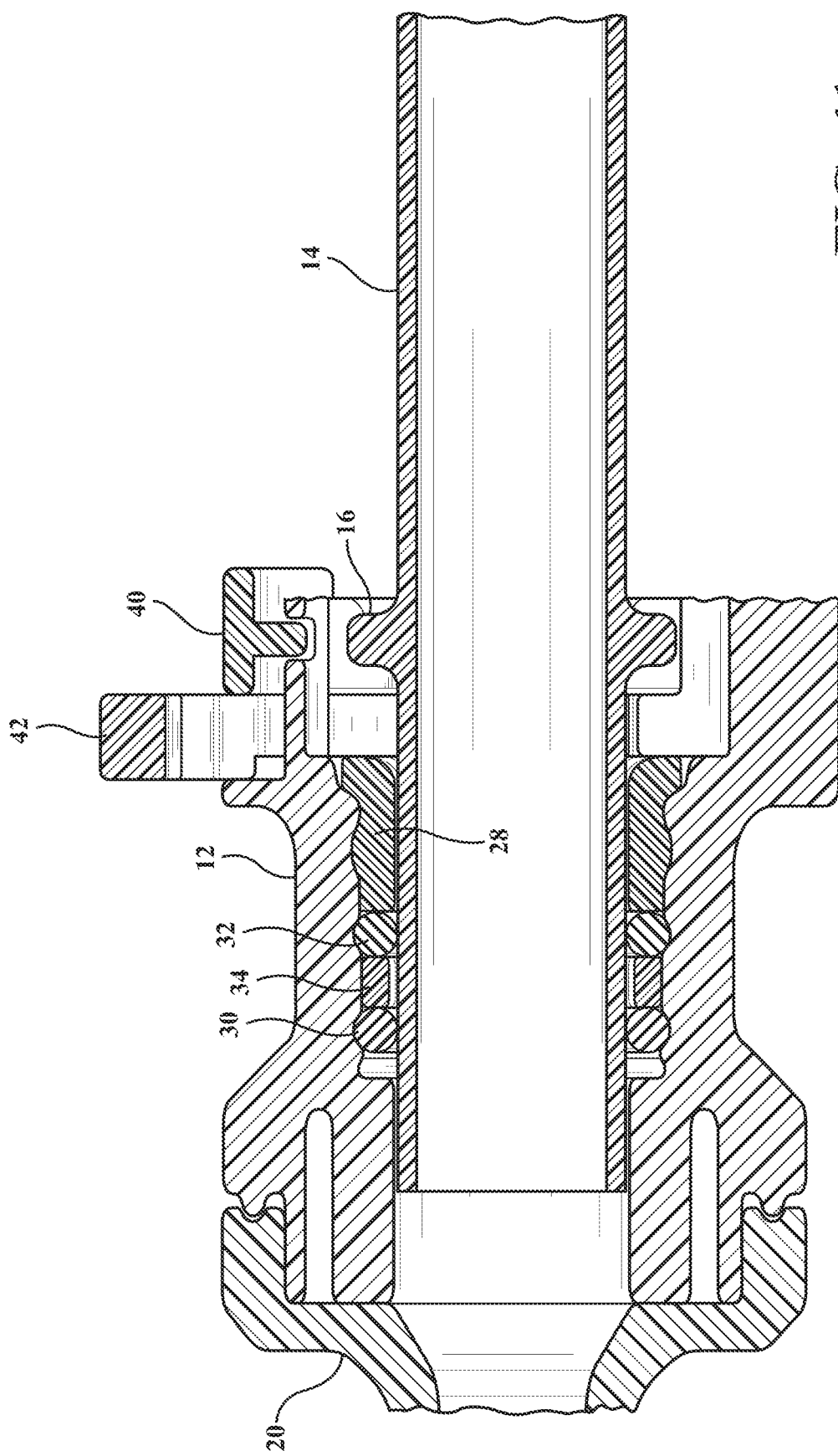
FIG. 11 is a succeeding view to FIG. 10 illustrating the tube with annular extending protuberance in an intermediate engaged position with the latch of the quick connect coupling corresponding to FIG. 4.

As again best shown in FIGS. 3 and 9, the verifier 42 includes the pair of axially extending tabs 60 and 62 which are received within the recessed channels 64/66 formed along the sides 48/50 of the latch 40. Consequently, when the tube bead 16 is aligned with the latch 40, and thus not in a fully connected position, the verifier tabs 60 and 62 are positioned within the recessed channels 64 and 66 (again FIG. 9) which restrains the verifier 42 in the position shown in FIG. 4 and prevents the verifier 42 from becoming aligned with the latch 40.

Upon further insertion of the tube 14 into the housing female part 12 and to the position shown in FIGS. 5 and 12), the tube bead 16 passes behind the latch 40 to its fully locked position. In this position, the legs 48 and 50 of the latch 40 return to their original undeflected position and prevent retraction of the bead 16 and tube 14 from the female part 12 of the coupling, this further caused by the planar and sharp inside rear edges of the latch sides 48/50 abutting the tube bead 16 in the installed/engaged position. At this point, extending end locations of the pair of sides 48/50 of the latch are configured as inwardly facing hook shaped portions 68 and 70 which engage opposing and offset lateral projections 72 and 74 configured upon the housing female part 12 and so that a pair of valley recesses 76 and 78 on the sides of the housing female part 12 seat the hook shaped portion 68 and 70 in order to lock the latch 40 to the female part 12 of the connector.

After full insertion of the tube 14 into the quick connect housing 12, the bead 16 is aligned with the verifier 42 as shown in FIG. 5. When this occurs, the bead 16 deflects the sides 52 and 54 of the verifier 42 radially outwardly away from the tube 14 so that the tabs 60 and 62 on the verifier 42, which are normally positioned within the channel recesses 64/66 formed in the opposing sides 48/50 of the latch 40, are deflected out of the channel recesses (such occurring upon the snap installed retraction of the latch sides following passage of the tube bead).

Figure 6:
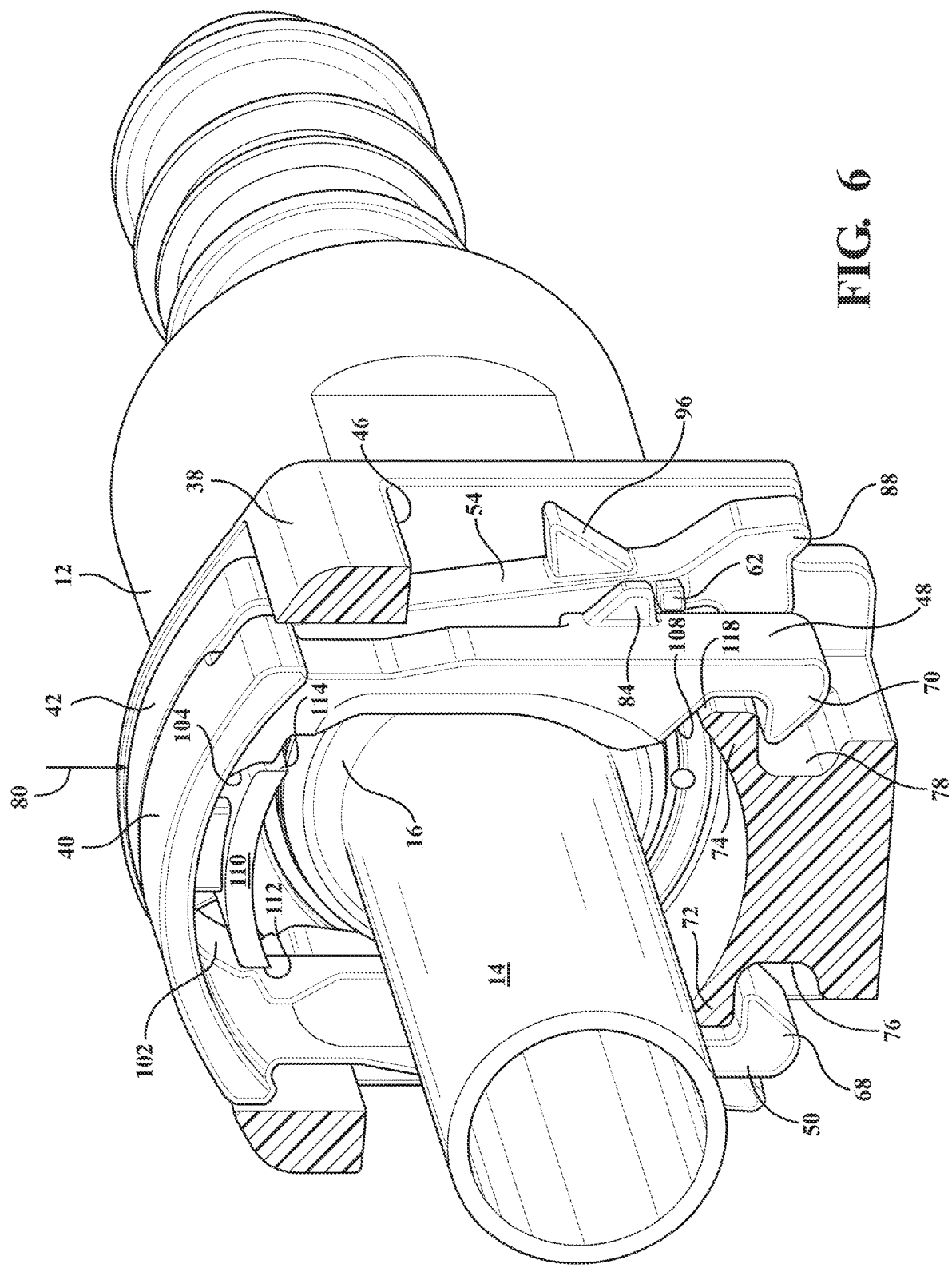
FIG. 6 is a view similar to FIG. 5, but showing the tube fully inserted into the fluid connector and with the verifier displaced to lock the latch in the engaged position.
Figure 7:
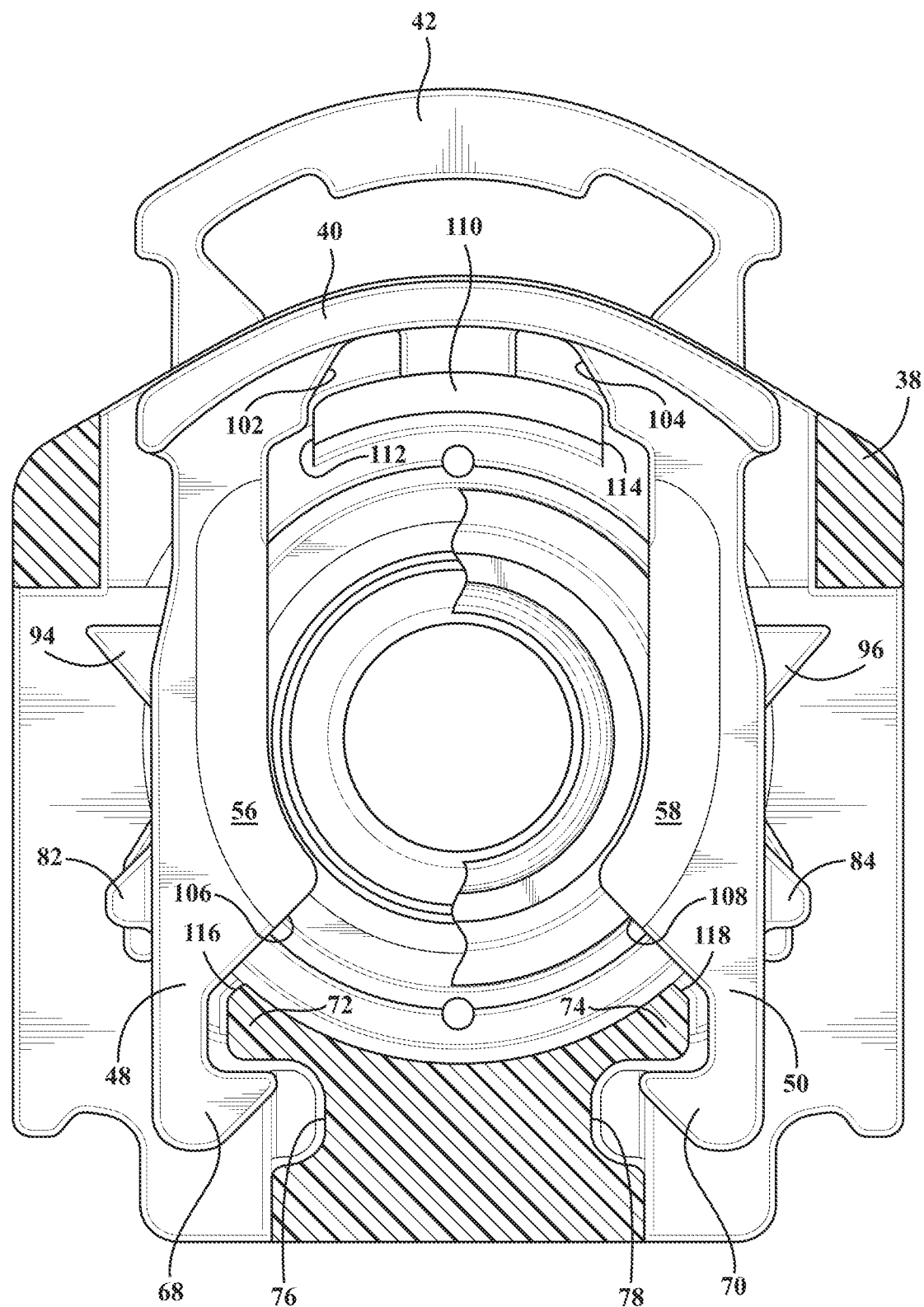
FIG. 7 is an end view of the fluid coupling substantially in the position of FIG. 2 and with parts removed and in sections for clarity.
Figure 8:
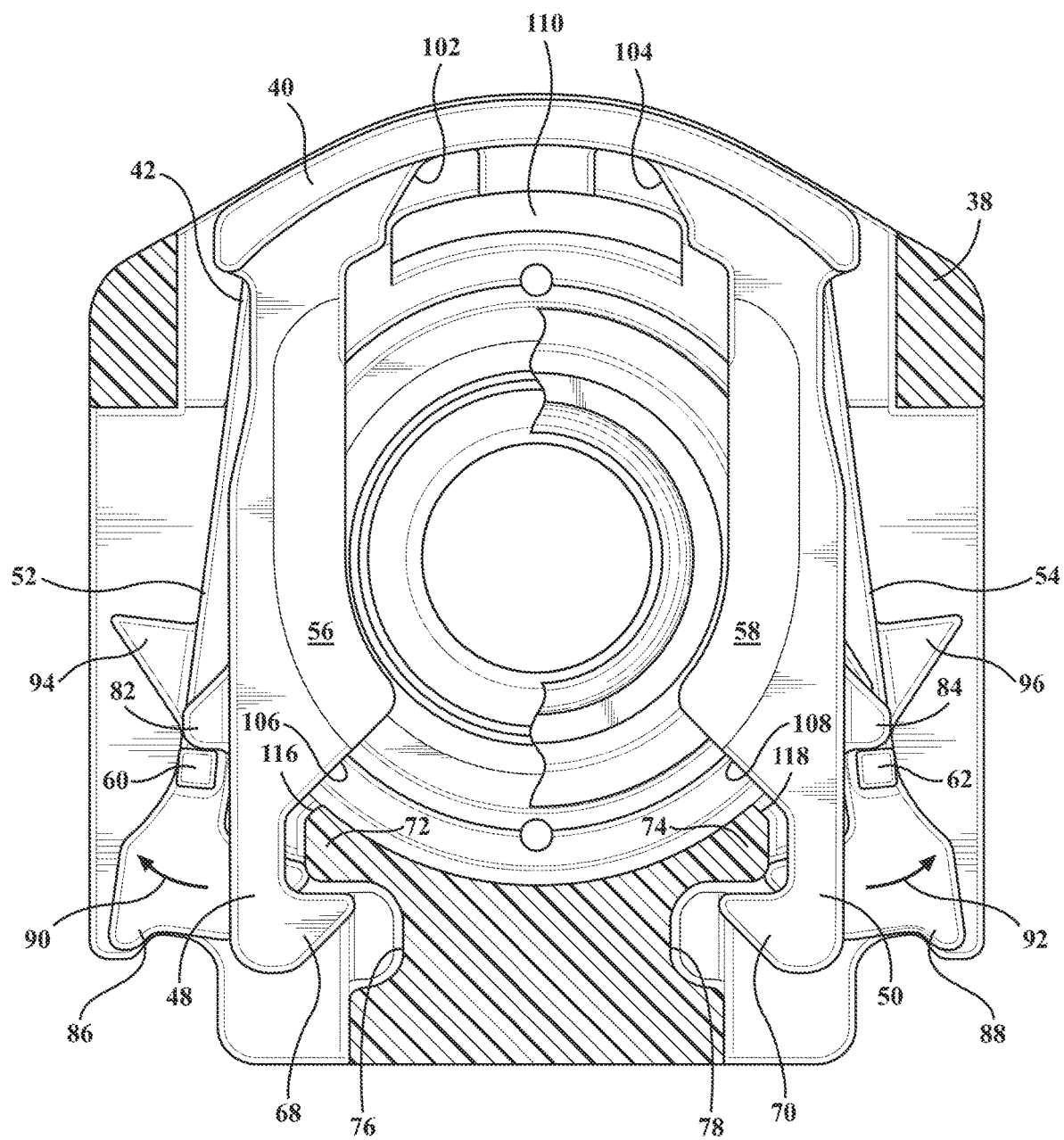
FIG. 8 is a view similar to FIG. 7, with the tube removed for purpose of clarity of illustration, and illustrating the fluid connector in a fully connected position.

Consequently, after full insertion of the tube 14 into the housing female part 12, the verifier 42 can then be moved from the radially outer position shown in FIG. 5, in a downward direction as represented by arrow 80 in FIG. 6, to the radially inner position or locked position shown in FIG. 6. This final installation motion of the verifier 42 causes the laterally expanded and exposed tabs 60/62 to be displaced downwardly into contact with angled side projections 82 and 84 configured upon the exposed edge surfaces of the sides 48 and 50 of the latch 40 (best shown in FIG. 8). In doing so, the latch 40 and verifier 42 are aligned with each other, thus indicating that the tube 14 is fully inserted and locked to the coupling.

Furthermore, as the verifier 42 is moved from the position shown in FIG. 5 to the position shown in FIG. 6, the tabs 60/62 engage and slide over side ramped locations of the angled projections 82/84 formed on the latch sides 48/50. Once the verifier 42 is moved to its fully connected position shown in FIG. 6, the material resilience of the verifier 42 causes its sides 52/54 to retract radially inwardly so that the tabs 60/62 are seated against an underneath planar ledge of the angled side projections 82/84. The opposing surfaces of the tabs 60/62 and the latch sides 52/54 with associated angled projections 82/84 further may define cam surfaces to facilitate smooth motion of the tabs during downward locking displacement of the verifier 42. Furthermore, the verifier and lock can only be moved and locked into alignment with each other when the tube is fully inserted and locked to the connector.

Removal of the tube 14 is accomplished by concurrently and outwardly deflecting exposed lower end projections 86 and 88 of the sides 52/54 of the verifier 42 (from the engaged position of FIGS. 1 and 8) in opposite directions (see arrows 90 and 92 in FIG. 8) and so that the tabs 60/62 unseat outwardly from the angular side projections 82/84 of the latch 40. At this point, the sides 52/54 of the verifier 42 are free to be displaced upwardly in a direction opposite to arrow 80 in FIG. 6 and to return the verifier 42 to its radially expanded position (FIG. 5) in which sides of the verifier are held against the aligned tube bead 16 and a pair of additional triangular shaped side projections 94 and 96 of the verifier 42 are caused to abut underside surfaces of the housing female part receiving end 38, these revealed by the side channels 46 configured into the receiving end 38.

At this point (again referring to FIG. 5), the latch 40 is caused to be opened by exerting a downward force on the top band portion of the latch 40 (in similar direction to arrow 80 depicted in FIG. 6 in association with final install of the verifier). Exerting the downward force on the latch 40 causes an inside projecting profile of the latch with upper angled surfaces 102 and 104 in the sides 48/50, in combination with lower angled surfaces 106 and 108, abutting against opposite ledge locations integrated into the housing female part. The ledge locations are further depicted by an upper portion 110 with opposite ledge surfaces 112/114 for respectively engaging the upper angled surface 102/104, in combination with lower ledge surfaces 116/118 for respectively engaging the lower angled surfaces 106 and 108 in order to expand the sides 48/50 of the latch 40 upon downward pressing and so that, following unlocking and re-raising of the verifier 42, downward depressing of the top band of the latch 40 interconnecting the sides 48/50 causing the latch sides to displace along the ledges in outwardly deflecting fashion to permit withdrawal of the tube 14.

Figure 15:
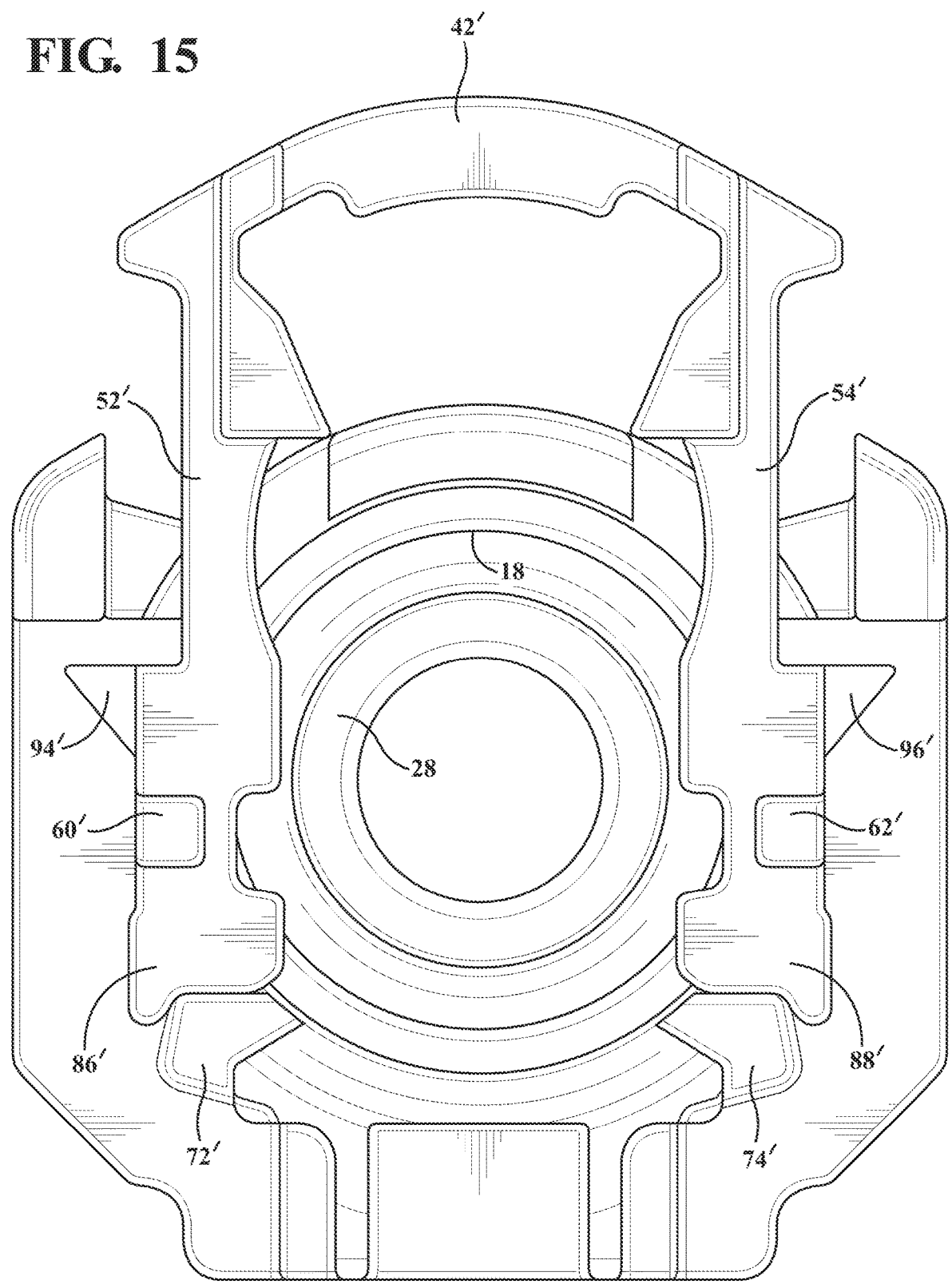
FIG. 15 is an end plan view of a quick connect coupling according to a further embodiment of the present invention with latch and tube removed and illustrating an alternate configuration of a verifier.

As further shown in FIG. 15, an end plan view is shown in cross section of a variant 42' of the verifier of the quick connect coupling, such as according to a related and slightly modified embodiment, with the latch and tube removed and illustrating the verifier down towards the seal pocket defined in the female housing part. The verifier 42' in this variant exhibits a slightly different profile in the configuration of its pair of sides, at 52' and 54', and its lower engaging ends 86' and 88' which engage alternately configured offset lateral projections 72' and 74' configured upon the housing female part in the installed and locked position. Additional features include variations of the tabs, at 60' and 62', as well as the pair of additional triangular shaped side projections, further at 94' and 96' of the verifier 42' which are again caused to abut underside surfaces of the housing female part receiving end.

From the foregoing, it can be seen that the quick connect coupling of the present invention provides a simple and yet fully effective means for verifying the full connection of a quick connect coupling. Furthermore, since both the verifier and the latch are positioned so that the latch and verifier register with each other upon full connection, the full connection of the coupling may be rapidly confirmed.

Having described our invention, other and additional preferred embodiments will become apparent to those skilled in the art to which it pertains and without deviating from the scope of the appended claims. This can further include reconfiguring the quick connect for any other fluid applications, as well as utilizing versions of the coupling for providing an electrical quick connect.

I claim:

1. A quick connect assembly, comprising:
   a housing through which extends a throughbore;
   a tube having an annular extending bead for insertion within the throughbore;
   said housing supporting a latch having sides in communication with the throughbore;
   a verifier adjacent said latch, said verifier having sides in communication with said sides of said latch;
   a tab protruding from each of said sides of said verifier, said tabs seating within recessed channels defined in opposing contact locations of said sides of said latch prior to insertion of said tube; and
   insertion of said tube resulting in expanding of both said latch and said verifier, said sides of said latch seating in an engaged position upon passage of said annular bead, said sides of said verifier held open by alignment with said annular bead representing said tube in an installed position, said verifier being displaced in a direction relative said tube to lock said latch in the engaged position.

2. The invention as defined in claim 1, further comprising said latch and said verifier being slidably mounted to said housing in a direction radial with respect to an axis of the throughbore.

3. The invention as defined in claim 1, further comprising each of said latch and retainer having a "U" shape and being constructed of a flexible and resilient material.

4. The invention as defined in claim 1, further comprising said latch and verifier positioned in a stacked arrangement and installed through slots in said housing.

5. The invention as defined in claim 1, further comprising displacement of said verifier vertically relative said latch causing said tabs to cooperate with outwardly angled side locations of said latch in order to further expand and subsequently seat said retainer into locked engagement with said latch.

6. The invention as defined in claim 5, said side locations of said latch further comprising a polygonal shape with a planar underside for receiving said verifier tabs in the locked engagement.

7. The invention as defined in claim 5, said sides of said verifier further comprising exposed end projections which are manipulated outwardly and concurrently upwardly to unseat said tabs and to displace said verifier from said locked position to an unlocked position relative to said latch.

8. The invention as defined in claim 7, an inside projecting profile of said latch further comprising angled surfaces overlapping ledges integrated into said housing and, following unlocking of said verifier, downward depressing of a top band of said latch interconnecting said sides causing said sides to displace along said ledges in outwardly deflecting fashion to permit withdrawal of said tube.

9. The invention as defined in claim 1, said sides of said latch further comprising chamfered inner profiles which receive and are expanded by said annular extending bead during insertion of said tube.

10. The invention as defined in claim 1, further comprising a tubular spacer and at least one seal inserted within said housing throughbore.

11. The invention as defined in claim 10, further comprising a plurality of heat stake locations about an exposed circumference of said spacer for preventing axial separation from said housing.

12. A pressurized fluid quick connect assembly, comprising:
a housing having a male part and a female part through which extends a throughbore;
a tube having an annular extending bead for insertion within the female part;
said housing supporting a latch having sides in communication with the throughbore;
a verifier in a stacked arrangement with said latch such that said latch and verifier are installed through slots in said housing and slidably supported in a direction radial with respect to an axis of the throughbore, said verifier having sides in communication with said sides of said latch;
a tab protruding from each of said sides of said verifier, said tabs seating within recessed channels defined in opposing contact locations of said sides of said latch prior to insertion of said tube; and
insertion of said tube resulting in expanding of both said latch and said verifier, said sides of said latch seating in an engaged position upon passage of said annular bead, said sides of said verifier held open by alignment with said annular bead representing said tube in an installed position, said verifier being displaced in a direction relative said tube to lock said latch in the engaged position.

13. The invention as defined in claim 12, further comprising each of said latch and retainer having a "U" shape and being constructed of a flexible and resilient material.

14. The invention as defined in claim 13, further comprising displacement of said verifier vertically relative said latch causing said tabs to cooperate with outwardly angled side locations of said latch in order to further expand and subsequently seat said retainer into locked engagement with said latch.

15. The invention as defined in claim 14, said sides of said verifier further comprising exposed end projections which are manipulated outwardly and concurrently upwardly to unseat said tabs and to displace said verifier from said locked position to an unlocked position relative to said latch.

16. The invention as defined in claim 15, an inside projecting profile of said latch further comprising angled surfaces overlapping ledges integrated into said housing and, following unlocking of said verifier, downward depressing of a top band of said latch interconnecting said sides causing said sides to displace along said ledges in outwardly deflecting fashion to permit withdrawal of said tube.

17. The invention as defined in claim 14, said side locations of said latch further comprising a polygonal shape with a planar underside for receiving said verifier tabs in the locked engagement.

18. The invention as defined in claim 12, said sides of said latch further comprising chamfered inner profiles which receive and are expanded by said annular extending bead during insertion of said tube.

19. A quick connect assembly, comprising:
a housing through which extends a throughbore;
a tubular spacer and at least one seal inserted within said housing throughbore;
a plurality of heat stake locations about an exposed circumference of said spacer for preventing axial separation from said housing;
a tube having an annular extending bead for insertion within the throughbore;
said housing supporting a latch having sides in communication with the throughbore;
a verifier adjacent said latch, said verifier having sides in communication with said sides of said latch; and
insertion of said tube resulting in expanding of both said latch and said verifier, said sides of said latch seating in an engaged position upon passage of said annular bead, said sides of said verifier held open by alignment with said annular bead representing said tube in an installed position, said verifier being displaced in a direction relative said tube to lock said latch in the engaged position.

* * * * *